July 20, 1937. V. M. BUGG ET AL 2,087,315
TIME STAMP AND NUMBERING MACHINE
Filed March 20, 1935 15 Sheets-Sheet 2
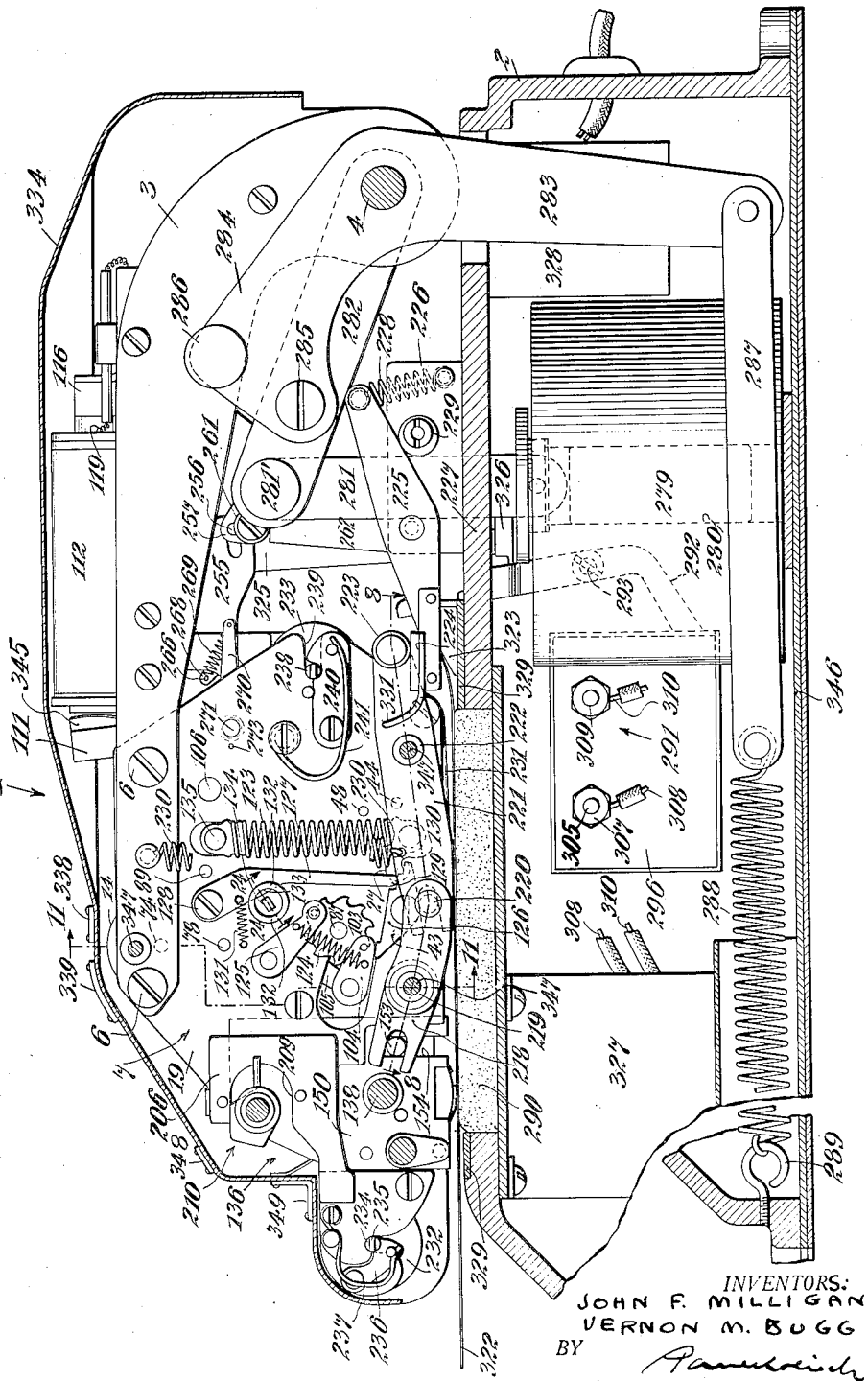
INVENTORS:
JOHN F. MILLIGAN
VERNON M. BUGG
BY
ATTORNEY

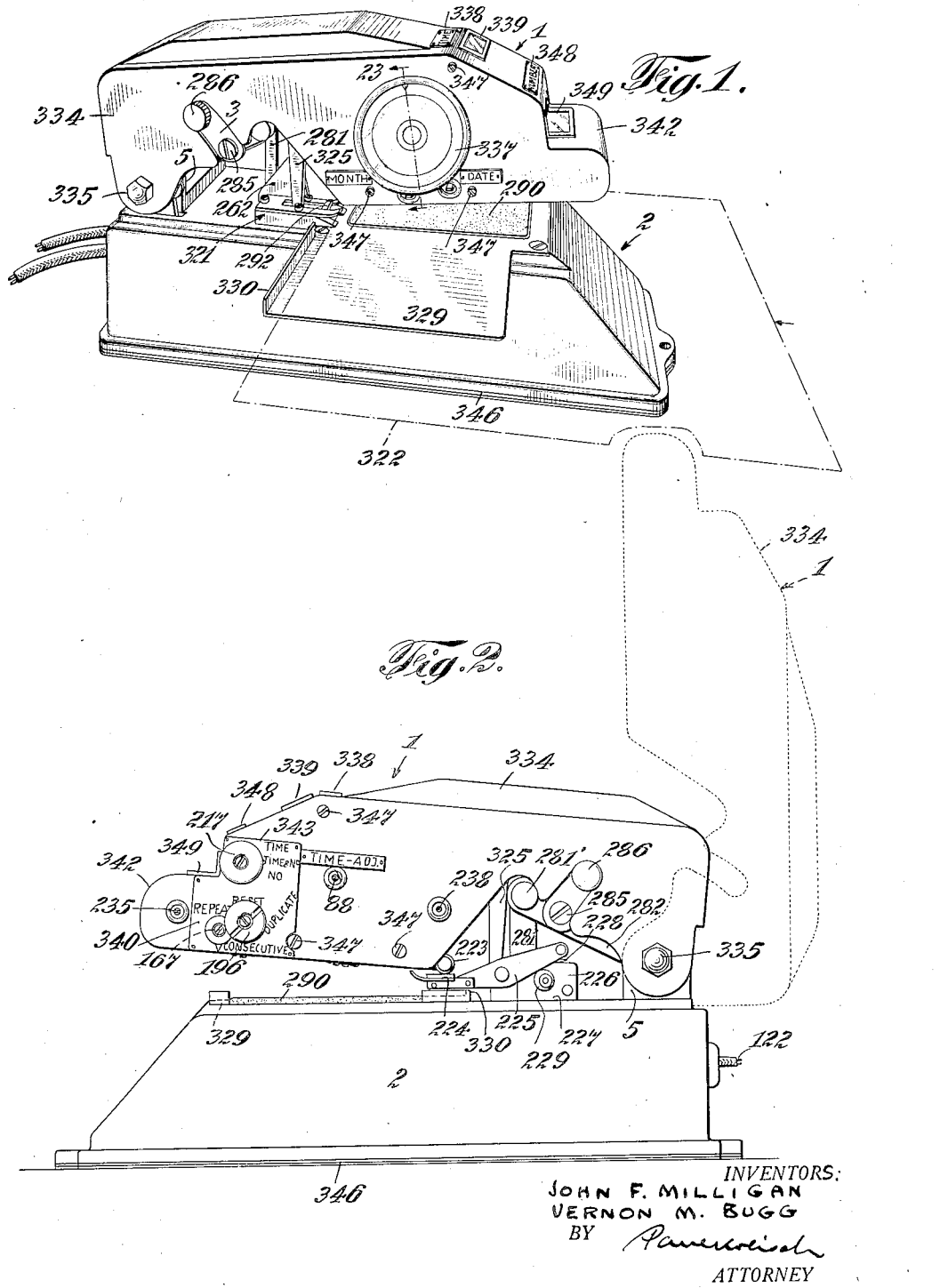

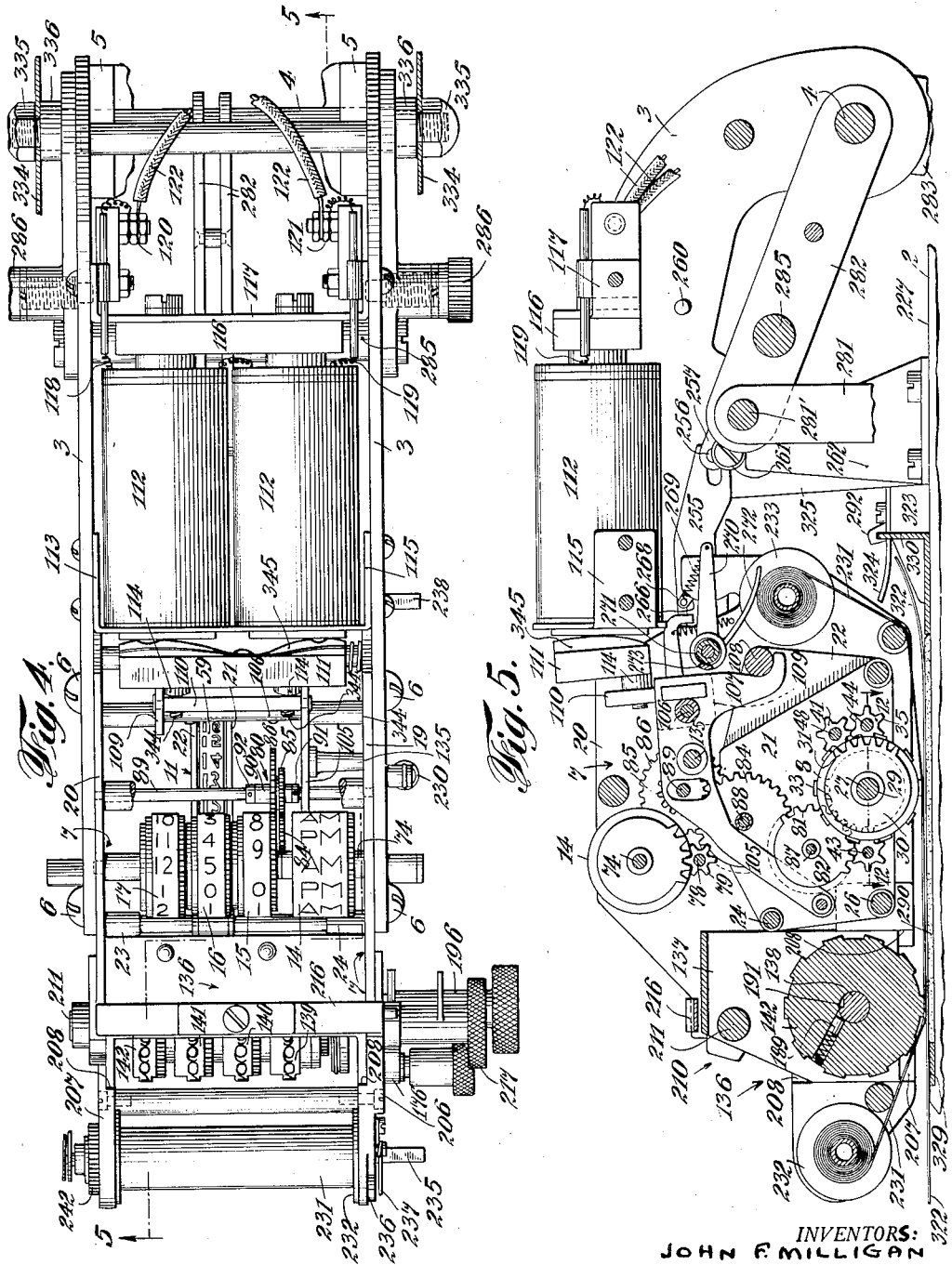

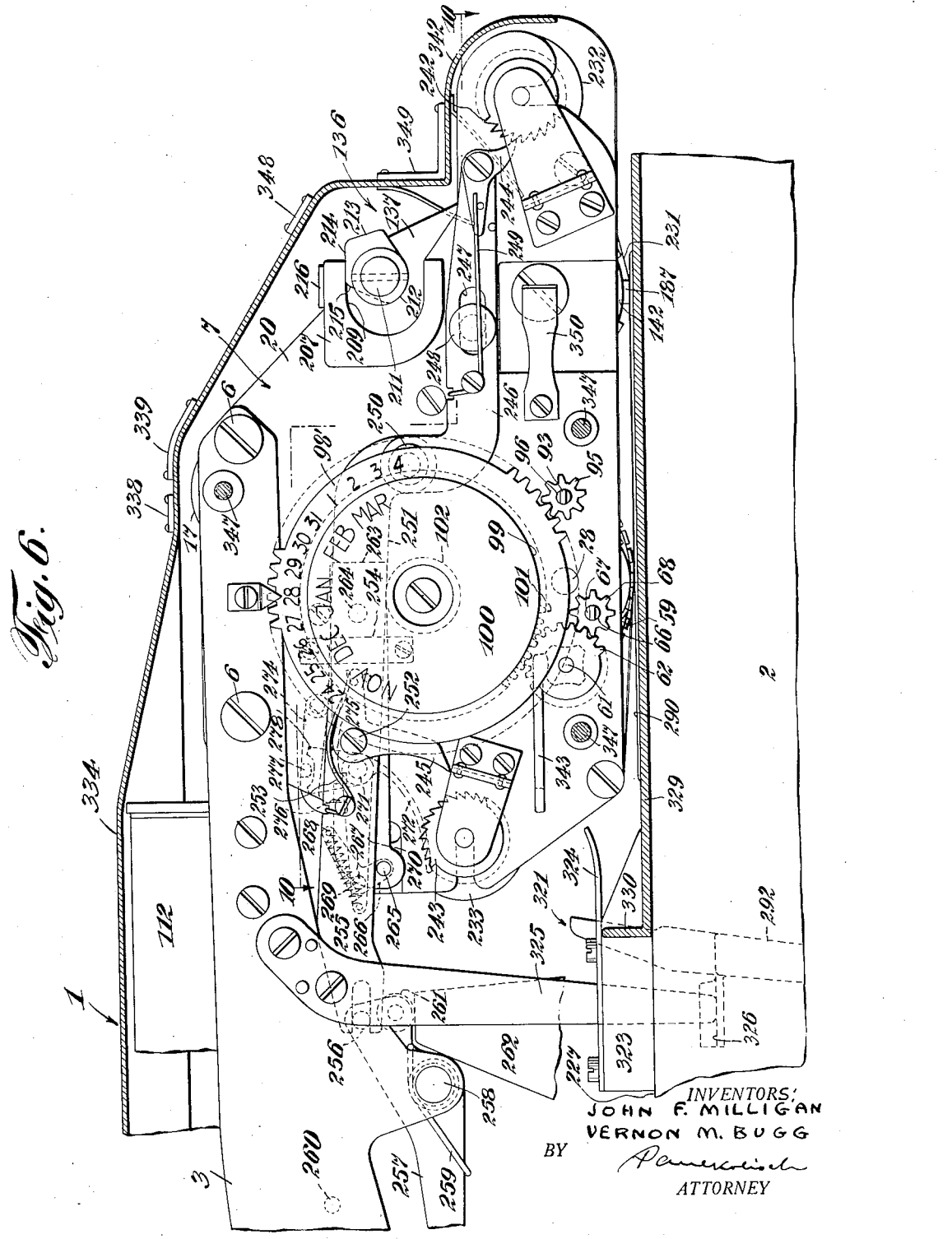

July 20, 1937. V. M. BUGG ET AL 2,087,315
TIME STAMP AND NUMBERING MACHINE
Filed March 20, 1935 15 Sheets-Sheet 5
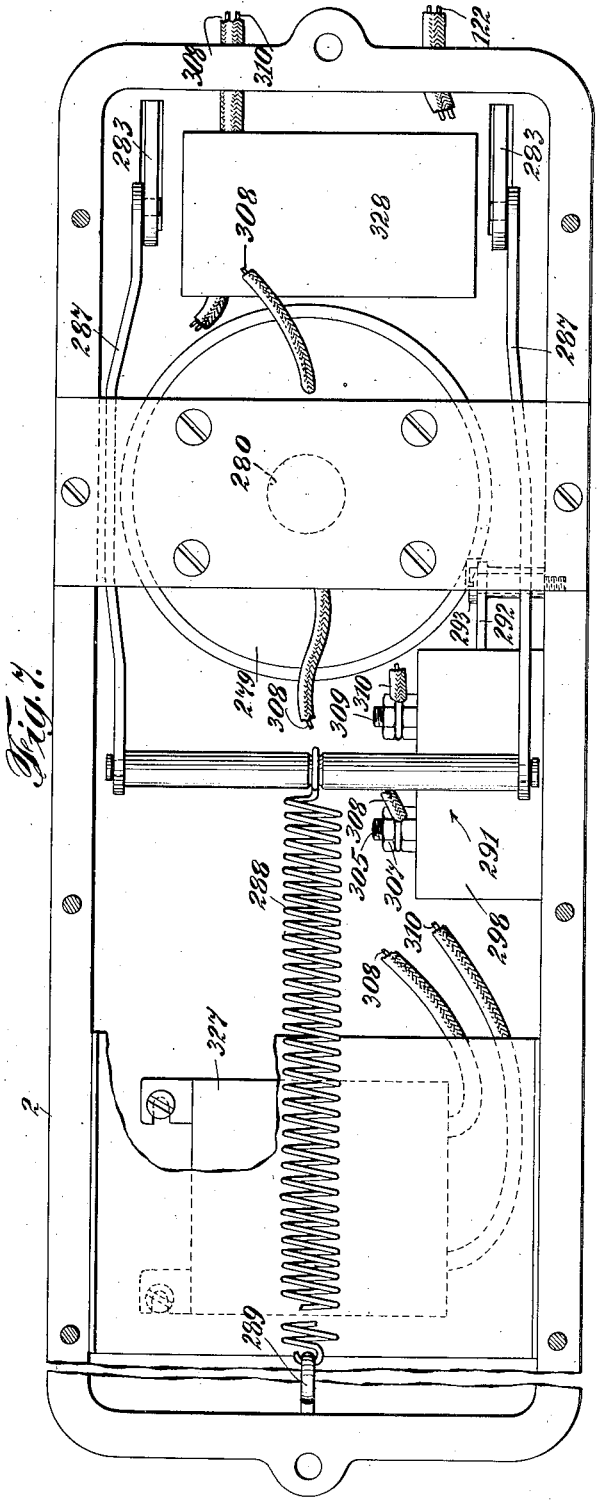
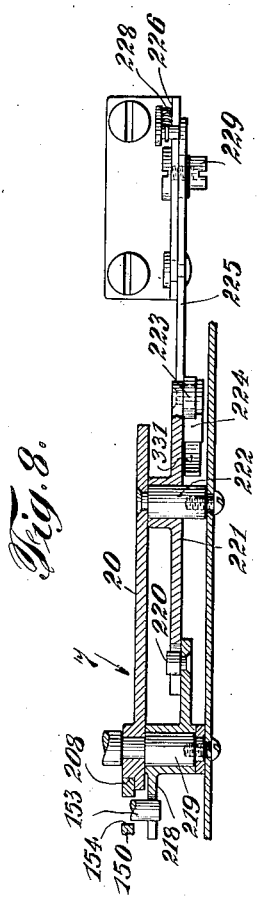
JOHN F. MILLIGAN
VERNON M. BUGG
INVENTORS
BY
ATTORNEY

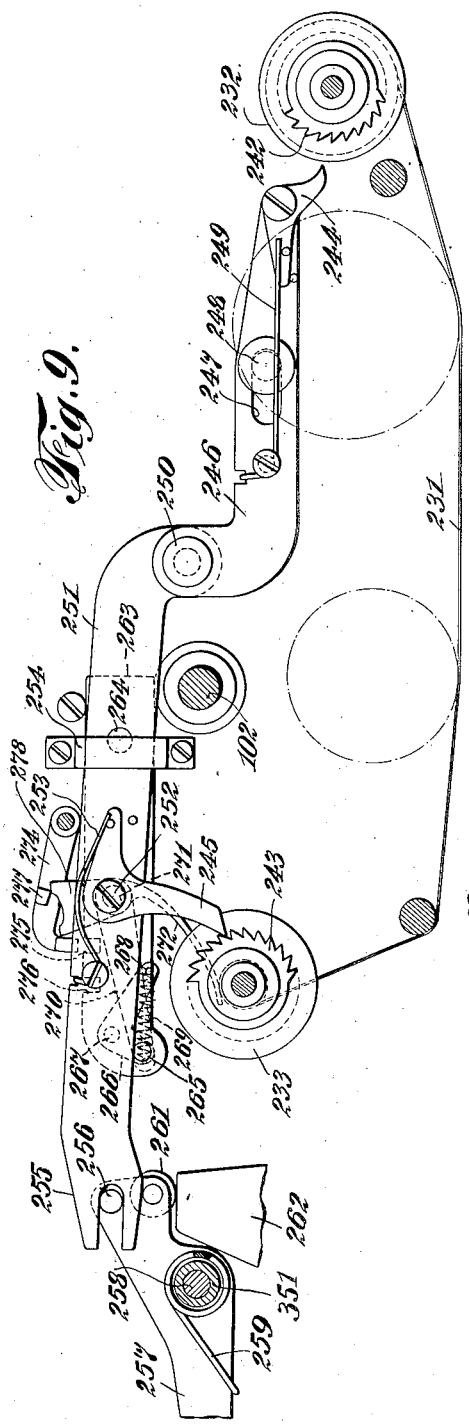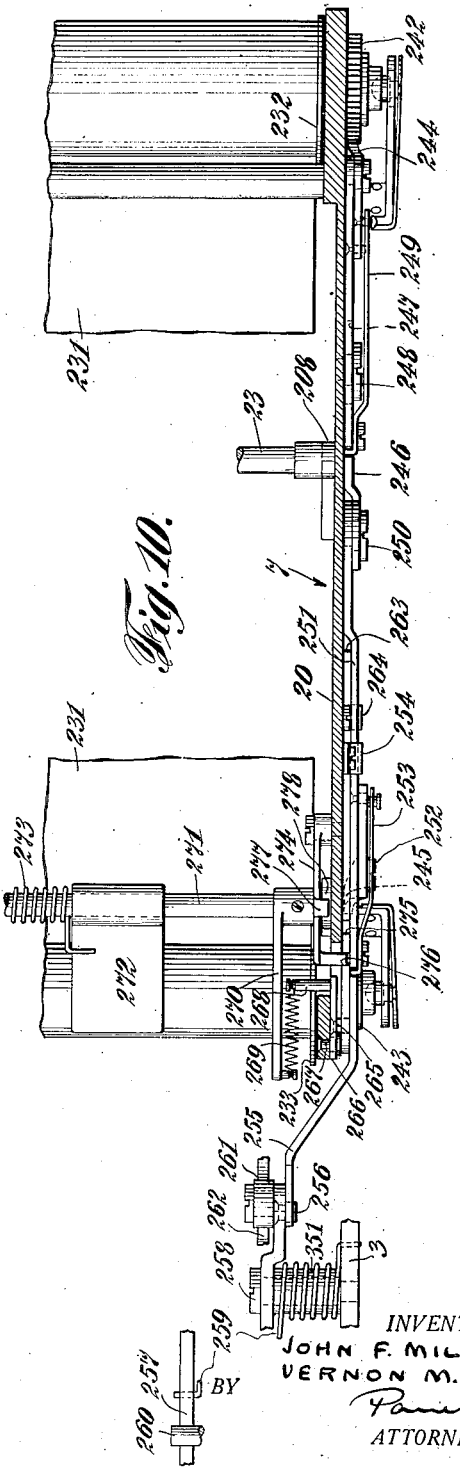

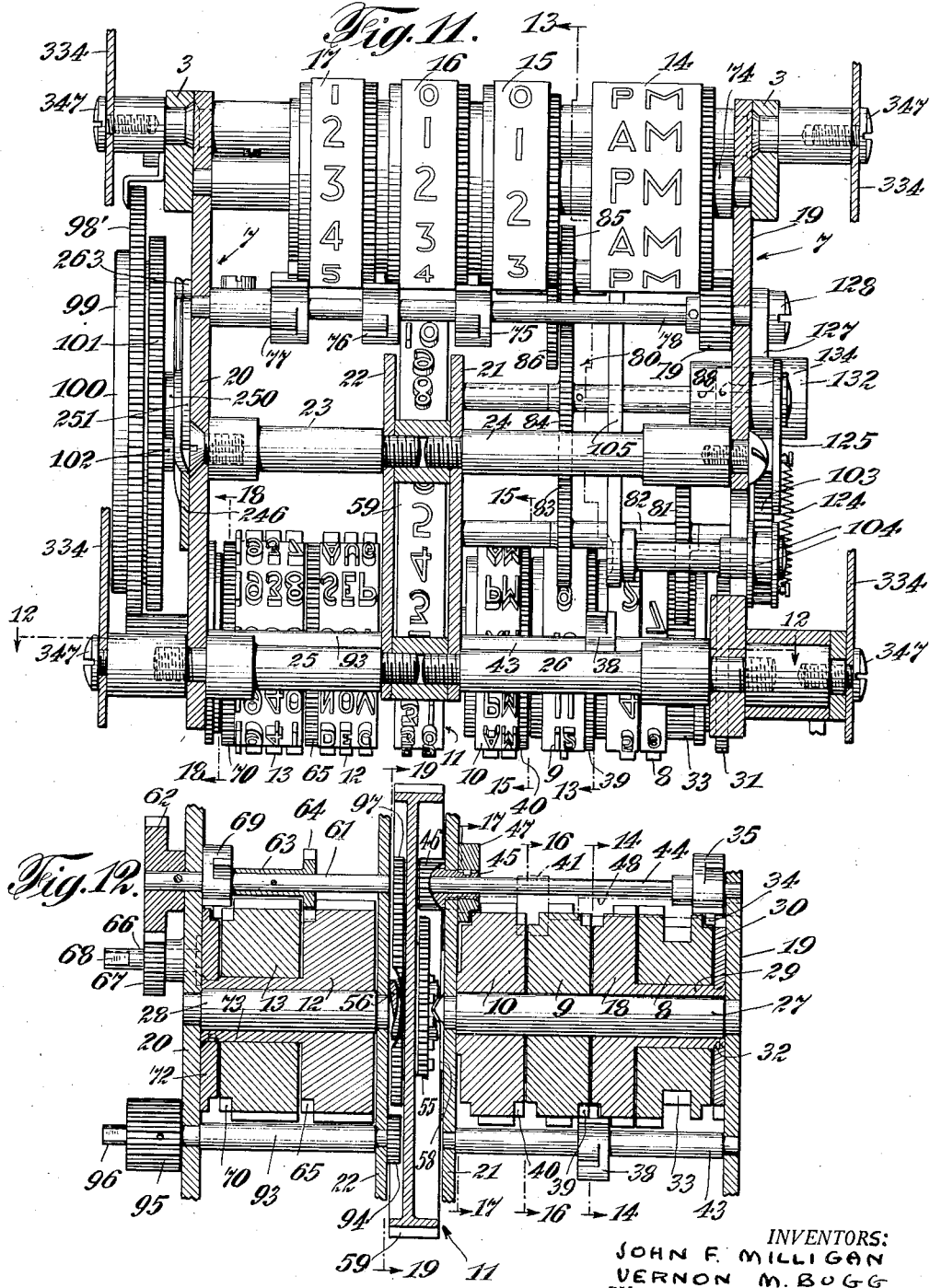

July 20, 1937.  V. M. BUGG ET AL  2,087,315
TIME STAMP AND NUMBERING MACHINE
Filed March 20, 1935   15 Sheets-Sheet 8

JOHN F. MILLIGAN
VERNON M. BUGG
INVENTORS

BY
ATTORNEY

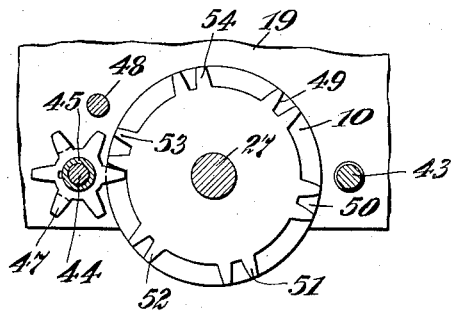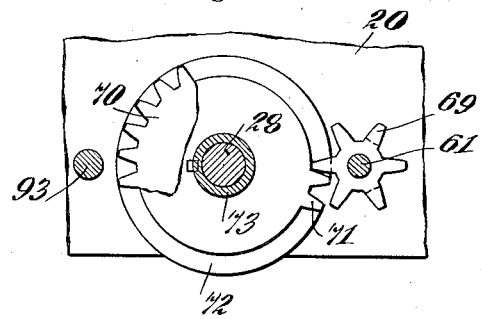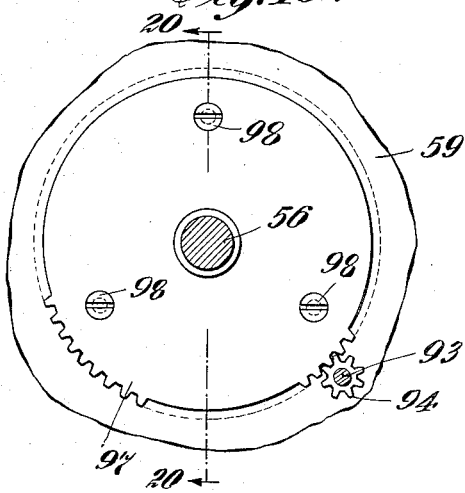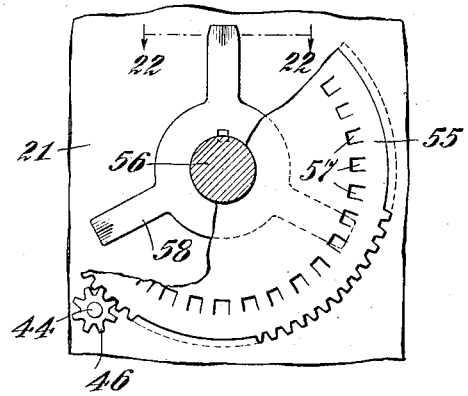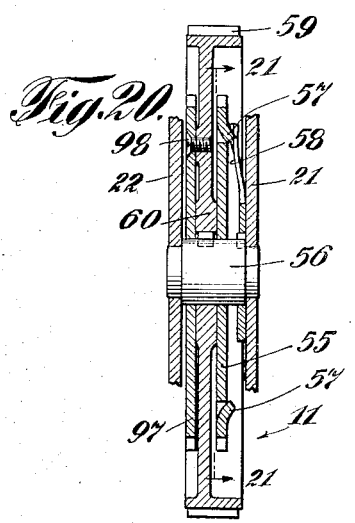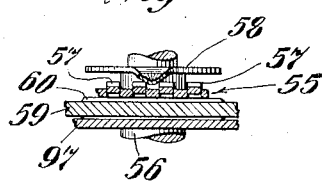

July 20, 1937. V. M. BUGG ET AL 2,087,315
TIME STAMP AND NUMBERING MACHINE
Filed March 20, 1935 15 Sheets-Sheet 10
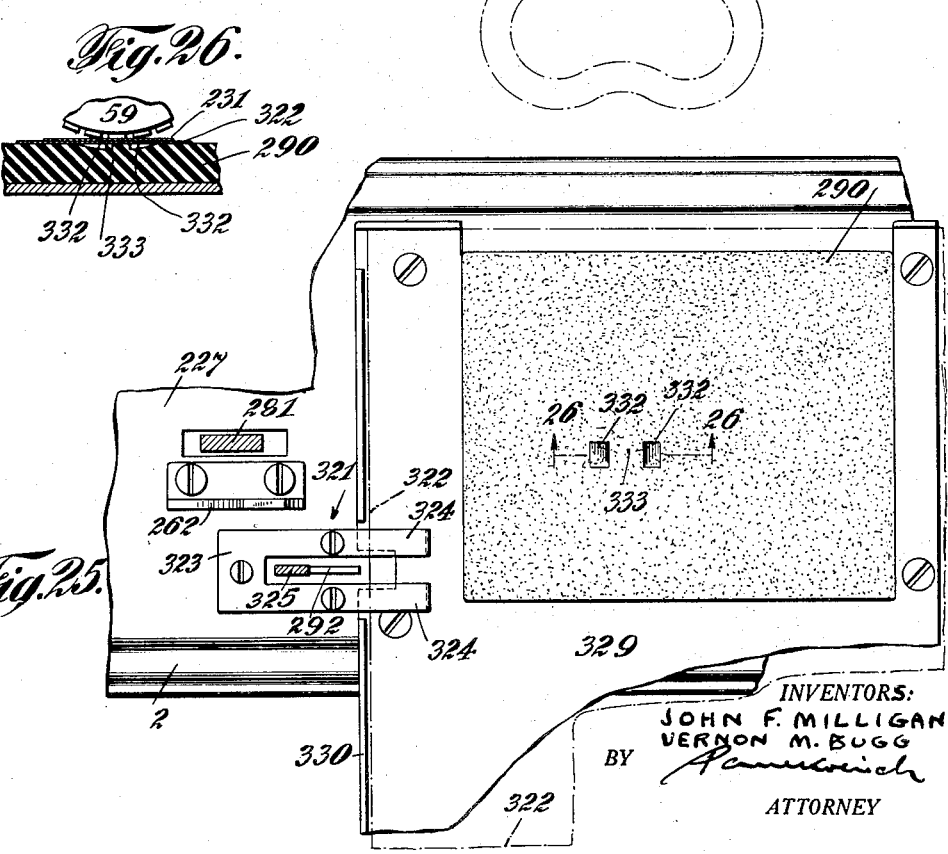
INVENTORS:
JOHN F. MILLIGAN
VERNON M. BUGG
BY
ATTORNEY July 20, 1937.  V. M. BUGG ET AL  2,087,315
TIME STAMP AND NUMBERING MACHINE
Filed March 20, 1935  15 Sheets-Sheet 11
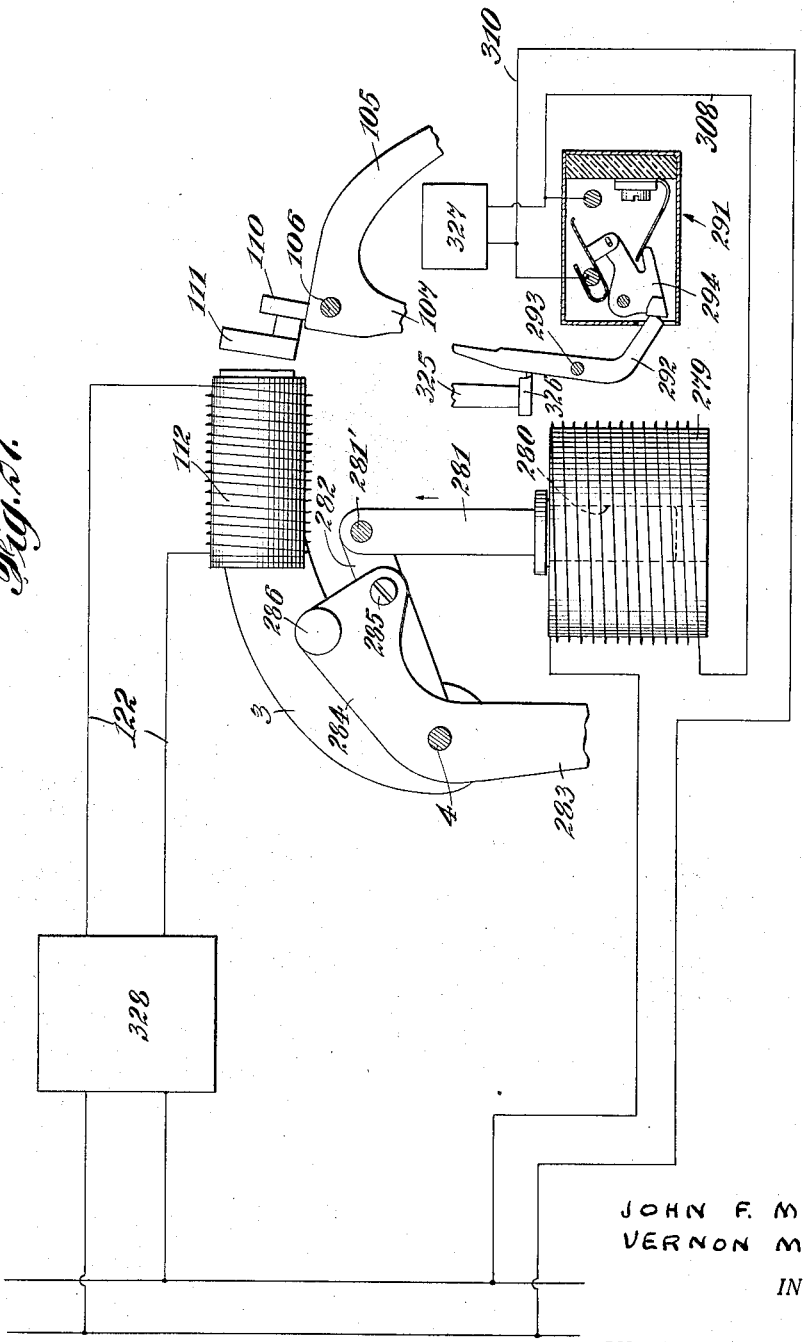
JOHN F. MILLIGAN
VERNON M. BUGG
INVENTORS
BY
ATTORNEY

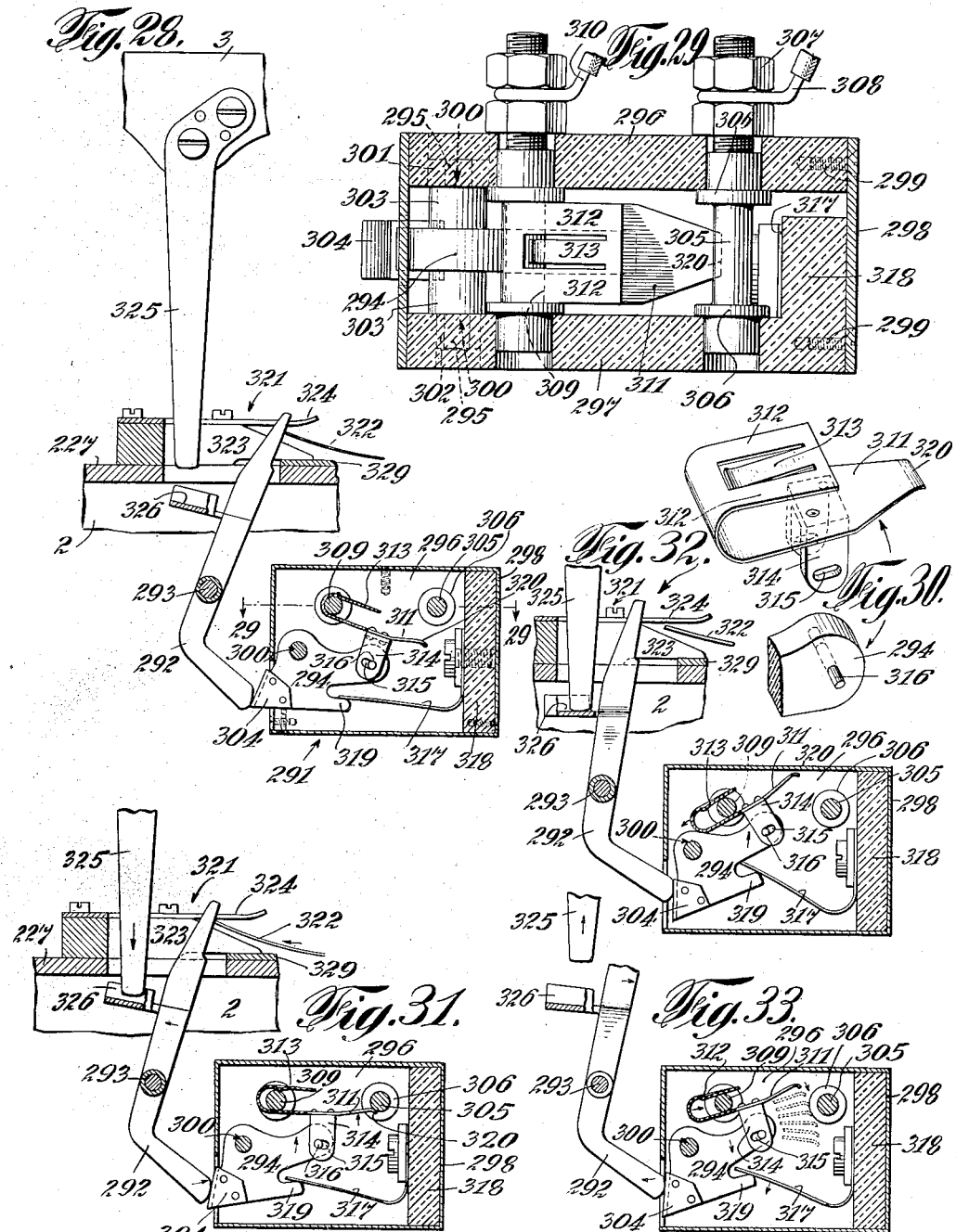

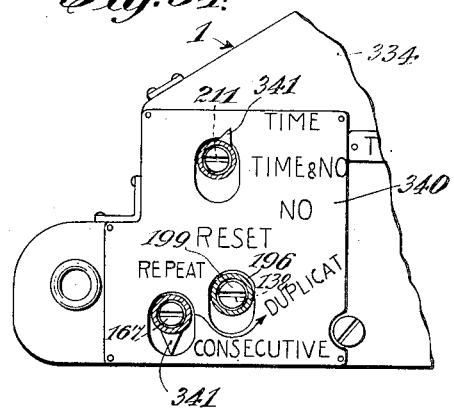
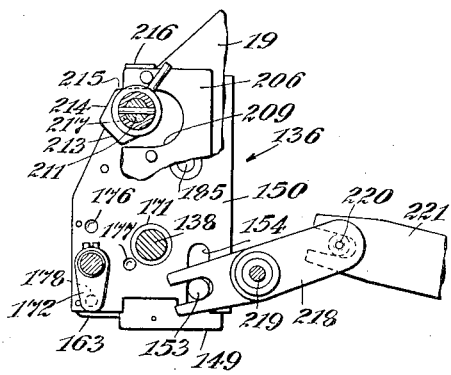
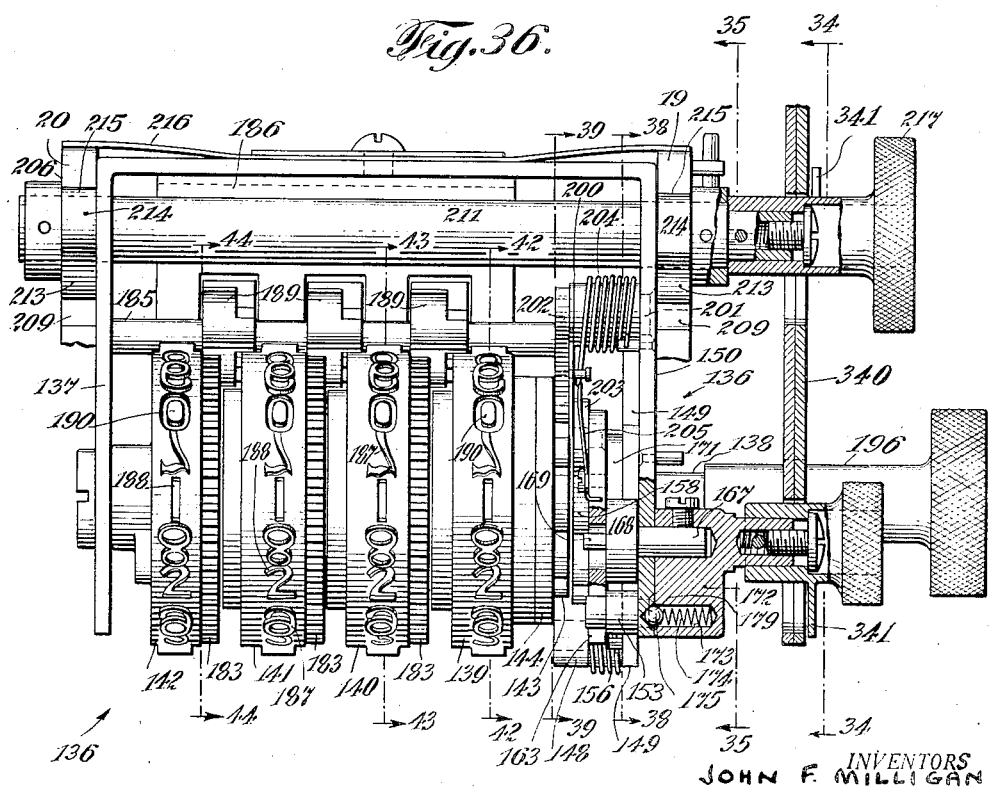

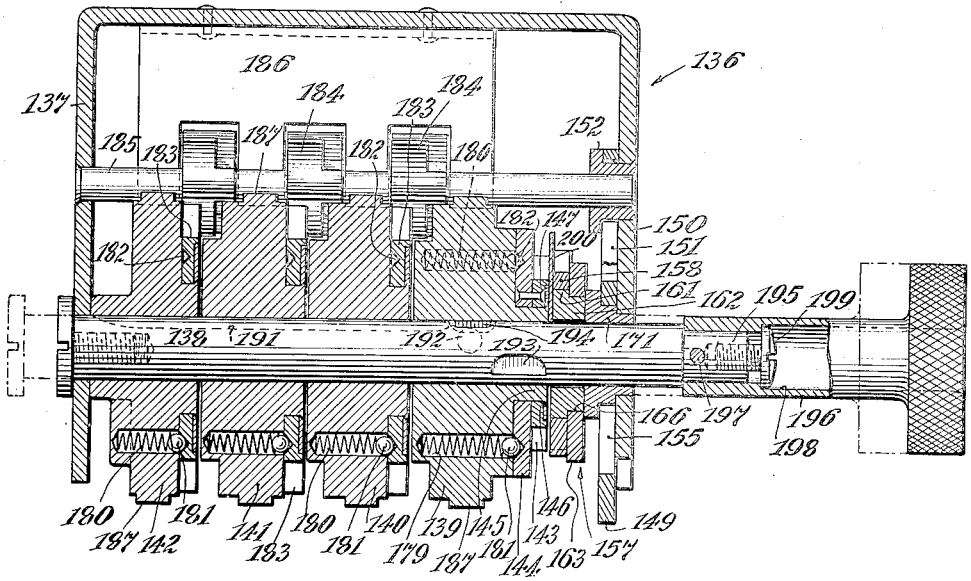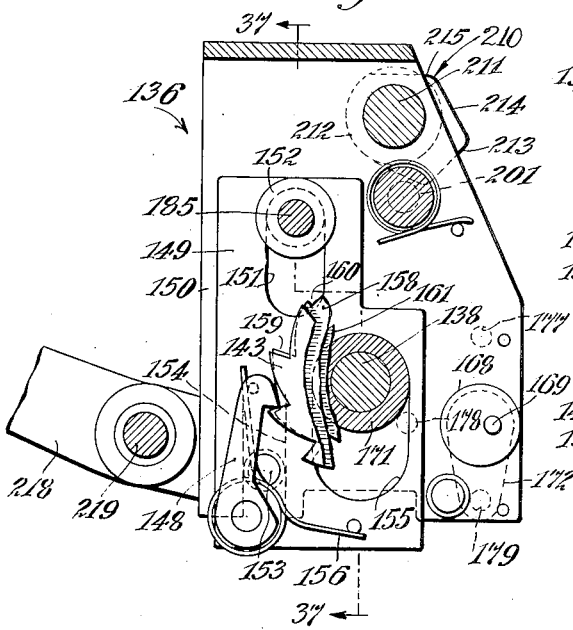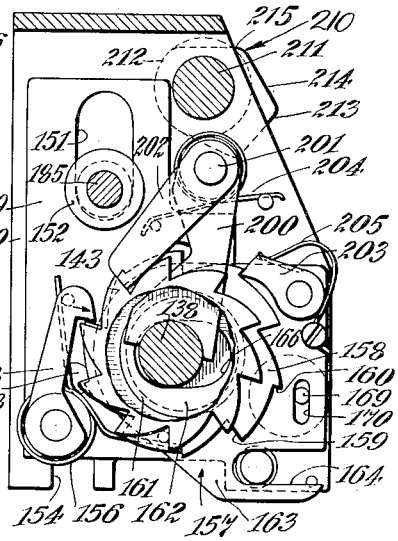

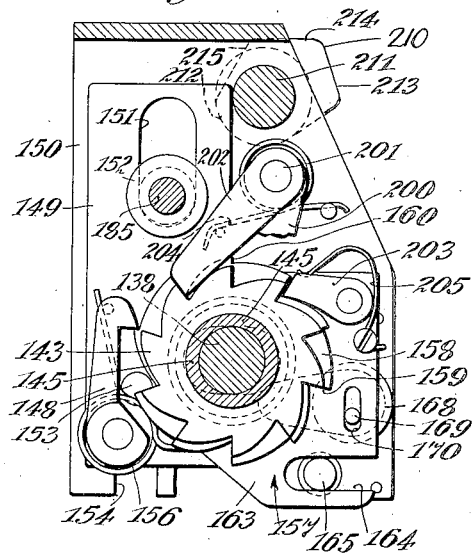
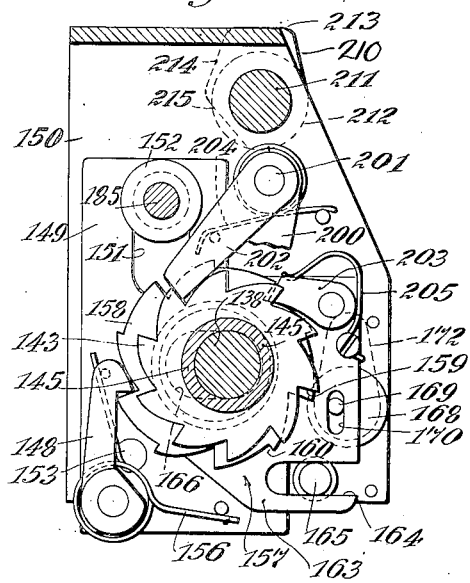
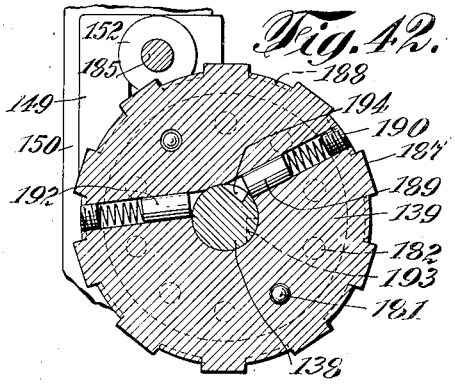
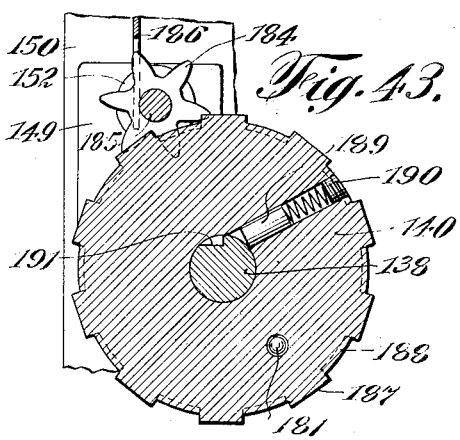

Patented July 20, 1937

2,087,315

UNITED STATES PATENT OFFICE 2,087,315

TIME STAMP AND NUMBERING MACHINE

Vernon M. Bugg, Binghamton, N. Y., and John F. Milligan, Ridgefield Park, N. J., assignors, by mesne assignments, to International Business Machines Corporation, a corporation of New York Application March 20, 1935, Serial No. 12,000

7 Claims. (Cl. 101—297)

This invention relates to stamp mechanisms of the type having a movable head and a platen, and which is adapted both to indicate a certain value or quantity and also to print it on a sheet of paper placed between the head and the platen.

The invention relates particularly to time or consecutive number stamps which are adapted to be operated either automatically upon insertion of a piece of paper between the head and the platen, or manually.

An object of our invention is to provide a time stamp having a movable head and a platen wherein the head is adapted to be moved towards the platen by electrical means under the control of an improved form of circuit closing switch.

Another object is the arrangement of the head with respect to the base holding the platen so that the head may be quickly disconnected from the driving mechanism and tipped backward to render the mechanism thereof readily accessible.

Further objects have to do with the designing of an improved form of counting wheel mechanism and resetting means therefor.

Still another object is the construction of a ribbon feeding mechanism which, while containing but few parts, is adapted automatically to advance the ribbon and reverse the direction of movement thereof at a desired time.

In accordance with our invention we provide a stamp comprising a base, holding a platen, and head which is pivotally connected to the base and adapted to move into contact therewith under the influence of a driving motor energized upon the insertion of a sheet of paper between the head and the platen.

The driving motor is electrical and is controlled by a switch. This switch is so arranged that upon the insertion of the paper, the circuit is closed, and responsive to downward movement of the head towards the platen to make an impression, is opened thereby permitting said head to return to its normal position. We arrange the head of the machine so that while it normally occupies a position relatively close to the platen it can, by an adjustment, quickly be rotated around its bearing to a position approximately at right angles to the base to expose the working mechanism carried by the head. Inside of the head is a plurality of groups of counting wheels which may be for the purpose of indicating the time of day and date as well as the year and/or certain numbers. The internal mechanism of the head may be so adjusted as to print the numbers consecutively or in duplicate or continuously to repeat the same number. For operating the time wheels electrical advancing means is furnished which turns the wheels step by step under control of an external master clock. The time indicating number wheels are adapted to be turned by driving means which is arranged to lock the wheels against motion when the head is moved into engagement with the platen. This is to insure that the shock caused by the number wheels striking the platen in the printing operation will not vary their angular position. A resetting device is connected to the number wheels and is so arranged that upon actuation thereof the locking means is disconnected and so rendered inactive.

The successive number wheels of our counting mechanism are interconnected by means of multi-position friction clutches so that the resetting operation may be easily performed.

In order to turn the number wheels to their zero position, the shaft is extended longitudinally through the center of the number wheels and is so fashioned as to form, in conjunction with spring pressed pawls carried by the number wheels, a one-way connection which can easily be operated. The several different groups of number wheels are each mounted on different frames so as to form distinct units and these units are fastened together and to the supports of the head. This arrangement insures that if anything goes wrong with one of the wheel units, that unit may be removed bodily without dismantling the machine. Likewise a unit may be quickly removed if it is desired to use the machine without it. We have also provided an improved form of adjusting device whereby one of the number wheel units may be moved vertically away from the platen with respect to the other number wheel unit so that either one or more of the number wheels may be caused to print at one operation. This is brought about by a spring connection between one of said units and the head and cam means for varying the spacing between said unit and said head against the action of said spring.

A ribbon is used in the printing operation interposed between the number wheels and the platen and in order to advance this ribbon we have devised a step-by-step motion transmitting system which serves to advance the ribbon one step for each impression made by the number wheels. The ribbon is carried by a pair of spools or reels and the advancing mechanism comprises a pair of levers pivotally interconnected and each of which is rockably mounted intermediate its ends. A pawl is attached to each of said levers and is adapted to cooperate with a ratchet wheel carried by a corresponding ribbon spool.

Advancement of the ribbon is accomplished by oscillating the free end of one of said levers. For reversing the direction of motion of the ribbon the levers are mounted for longitudinal movement with respect to their individual pivots so that one of the pawls may be moved into operating engagement with one of said ratchet wheels at the same time that the other pawl is moved out of engagement with its cooperating ratchet. Longitudinal movement of the levers is brought about by a device comprising a finger adapted to engage the ribbon wound up on one of said spools. This finger is fixed to a shaft which is interconnected by a passing center spring with one of said levers so that when the amount of ribbon wound on the spool just mentioned exceeds a predetermined amount, the passing center spring quickly moves the levers to such positions that one pawl is taken out of engagement with its ratchet wheel and the other pawl is put into engagement with the corresponding ratchet wheel.

The above mentioned and further objects and advantages of our invention and the manner of attaining them will be made clear in the following description and accompanying drawings.

In the drawings:

Fig. 1 is a perspective view of a stamp constructed in accordance with my invention.

Fig. 2 is a view of the machine shown in Fig. 1 looking at the reverse side thereof.

Fig. 3 is a side elevation view of my device partly in section.

Fig. 4 is a plan view of the stamp with the cover and base removed.

Fig. 5 is a sectional view of the stamp taken along line 5—5 of Fig. 4.

Fig. 6 is a side elevation view partly in section, of the head of the stamp.

Fig. 7 is a bottom view of the stamp showing the interior mechanism.

Fig. 8 is a fragmentary sectional view taken along line 8—8 of Fig. 3.

Fig. 9 is a detail view showing the ribbon feeding mechanism of the stamp.

Fig. 10 is a sectional view taken along line 10—10 of Fig. 6.

Fig. 11 is a detail vertical sectional view of the time and date wheel unit taken along line 11—11 of Fig. 3.

Fig. 12 is a horizontal sectional view taken along line 12—12 of Fig. 11.

Figure 14:
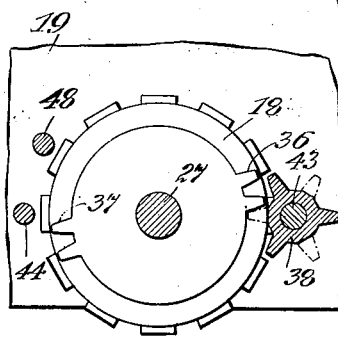
Figure 15:
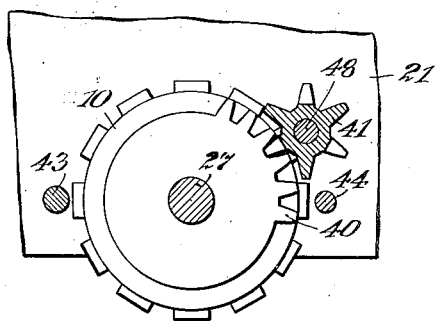
Figure 16:
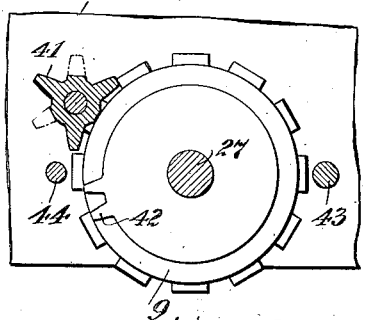

Figs. 14, 15, 16 and 17 are detail sectional views taken along lines 14—14, 15—15, 16—16 and 17—17 respectively of Figs. 11 and 12.

Fig. 18 is a detail sectional view taken along line 18—18 of Fig. 11.

Fig. 19 is a detail sectional view taken along line 19—19 of Fig. 12.

Fig. 20 is a sectional view taken along line 20—20 of Fig. 19 showing the friction clutch mechanism of the date wheel.

Fig. 21 is a detail sectional view with part broken away, taken along line 21—21 of Fig. 20.

Fig. 22 is a fragmentary section view taken along line 22—22 of Fig. 21.

Fig. 23 is a sectional view taken along line 23—23 of Fig. 1.

Fig. 24 is a sectional view taken along line 24—24 of Fig. 3.

Fig. 25 is a fragmentary view in plan showing the platen and the paper sheet guide and lock switch operating mechanism.

Fig. 26 is a sectional view taken along line 26—26 of Fig. 25 and shows a portion of the printing wheels and platen.

Fig. 27 is a fragmentary view showing the stamp head moving mechanism and circuit control therefor.

Fig. 28 is a fragmentary view in vertical section of the control switch and the operating mechanism therefor. This figure shows the switch in open normal position.

Fig. 29 is an enlarged sectional view taken along line 29—29 of Fig. 28.

Fig. 30 is an exploded perspective view of a portion of the switch mechanism.

Fig. 31 is a sectional view showing the switch just as it closes under the pressure of the paper being inserted in the machine.

Fig. 32 is a sectional view showing the switch after it has been opened by the movement of the stamping head towards the base.

Fig. 33 is a sectional view showing the path of travel of the switch arm as it returns to its normal position.

Fig. 34 is a fragmentary side elevation view taken along line 34—34 of Fig. 36, partly in section, of the head end of the machine showing the controlling shafts for resetting and adjusting the number wheels.

Fig. 35 is a side elevation view of the number wheel advancing mechanism taken along line 35—35 of Fig. 36.

Fig. 36 is an end elevation view of the number wheel unit.

Fig. 37 is a sectional view of the number wheel mechanism taken along line 37—37 of Fig. 38.

Fig. 38 is a sectional view taken along line 38—38 of Fig. 36.

Fig. 39 is a sectional view taken along line 39—39 of Fig. 36.

Fig. 40 is a view the same as 39, taken along line 39—39 of Fig. 36, with the exception that the mechanism is shown adjusted for producing duplicates.

Fig. 41 is a view similar to 39 taken along line 39—39 of Fig. 36, with the exception that mechanism is shown adjusted so as to print the same number consecutively.

Figs. 42 and 43 are sectional views taken respectively along lines 42—42 and 43—43 of Fig. 36.

Fig. 44 is a sectional view taken along line 44—44 of Fig. 36.

In the following description like reference numerals refer to like parts on the drawings.

Referring more particularly to the drawings, reference numeral 1 indicates the head of the time stamp and 2, the base thereof. The head comprises a pair of arms 3 (Figs. 3 and 4) pivotally supported on a shaft 4, carried by a pair of ears 5 of the base 2 of the machine.

Fixed between the free ends of the arms 3 and held in position by screws 6 is a frame 7.

*The time and date unit*

This frame serves directly to support minute wheels 8 and 18, (Figs. 11 and 12) hour wheel 9, meridian wheel 10, date wheel 11, month wheel 12 and year wheel 13. The printing wheels just mentioned are carried by the lower part of the frame 7 and at the upper part of the frame is supported meridian indicating wheel 14, minute wheels 15 and 16 and hour wheel 17. The frame 7 includes a pair of side plates 19 and 20 which have positioned between them frame members 21 and 22. The frame members and side plates are held together by means of suitable spacer bars 23, 24, 25 and 26 which are secured by screws and nuts. Extending between the frame member 21 and the side plate 19 is a bearing shaft 27 upon which are rotatably supported the minute wheels 8 and 18, hour wheel 9 and meridian wheel 10. A corresponding shaft 28 extends between frame member 22 and plate 20 and serves rotatably to support month wheel 12 and year wheel 13. Number wheels 9, 10 and 18 are mounted for free rotation upon the shaft 27 and the wheel 18 has a hub 29 serving as a bearing for the number wheel 8. The end of the hub 29 is reduced in diameter slightly to accommodate a retaining washer 30 which is held in place by a fillet formed on the end of the reduced portion of the hub. This retaining washer carries gear teeth 31 at its periphery and is keyed to the hub at 32. The number wheel 8 is made from a unitary piece of metal wide enough to provide a set of gear teeth 33 and a pair of carry-over gear teeth 34. These two carry-over teeth are partially visible in Fig. 12.

Meshing with the gear teeth 31 and teeth 34 is a carry-over pinion 35 which causes the tens minute wheel 18 to be advanced one-twelfth of a revolution for each revolution of the lower denomination wheel 8. The wheel 18 has two consecutive sets of numbers thereon from 1 to 6 inclusive and so makes one revolution every two hours. This wheel carries two sets of carry-over teeth 36 and 37 (Fig. 14) which are adapted to engage with a carry-over pinion 38 that meshes with gear teeth 39 of hour wheel 9. This arrangement insures that the tens minute wheel will be advanced one-twelfth of a revolution, or one step, for every revolution of the unit minute wheel 8, and that the hour wheel 9 will be moved ahead one-twelfth of a revolution or one unit for every half revolution of the tens minute wheel 18.

The meridian wheel 10 carries around its periphery six A. M. and six P. M. indications spaced alternately. This wheel must therefore be advanced one-twelfth of a revolution for every revolution of the hour wheel 9. To this end the meridian wheel 10 is furnished with a set of gear teeth 40 (Figs. 12 and 16) which mesh with a carry-over gear 41 that in turn is arranged to cooperate with a single set of carry-over teeth 42 fixed to the wheel 9.

The pinion 38 is fixed to a shaft 43 journaled in the frame member 21 and side plate 19. For supporting pinion 35 a shaft 44 is furnished, one end of which is rotatably mounted in the side plate 19 and the other of which passes through a hub 45 of a pinion 46. The hub is journaled in the frame member 21 and has keyed to its free end a carry-over gear 47.

The shaft 44 is adapted freely to rotate with respect to the hub 45. Carry-over gear 41 is in turn fixed to shaft 48 likewise rotatably held in the side plate 19 and frame member 21. Meridian wheel 10 has fixed thereto six sets of carry-over teeth 49, 50, 51, 52, 53 and 54 (Fig. 17) which cooperate with the carry-over gear 47 thereby serving to rotate said gear one step for every one-sixth of a revolution of gear 10. As there are twelve meridian indications on the wheel 10, six A. M. and six P. M. and only six sets of carry-over teeth, the pinion 46 will be turned one step for every pair of meridian indications, i. e., for every day. The pinion 46 meshes with a flat gear 55 rotatably supported on a short shaft 56, as shown most clearly in Fig. 20. This gear has projections 57 struck up from the side of it, which are adapted to be engaged by a three-fingered spring washer 58 (Figs. 20, 21 and 22) which is keyed to the shaft 56. The fingers of the spring washer engage the projections 57 and provide a driving connection between the shaft 56 and the gear 55. Keyed to the shaft 56 is a large number wheel 59 carrying numbers 1 to 31, representing the days of the month. It will be seen that by virtue of the spring fingers of the washer 58, and the projections 57, the number wheel 59 is caused to rotate in step with the flat gear 55. Hence, when the pinion 46 is turned the number wheel 59 is likewise advanced. The shaft 56 is rotatably supported in the two frame members 21 and 22. The number wheel 59 has a thickened hub 60 for spacing the gear 55.

A shaft 61 is journaled in side plate 20 and frame member 22 and has keyed to it gear 62 and sleeve 63. This sleeve is made integral with drive pinion 64 meshing with gear portion 65 of month wheel 12. By this arrangement, which constitutes a resetting device, when the gear 62 is turned the month wheel 12 is moved to a new position. The hub of the gear 62 is squared as shown in Fig. 6 and is engaged by leaf spring 343 which holds the gear in a given position such that one number of the date wheel is always aligned with the printing position. The act of resetting may be carried out through the agency of a stub shaft 66, rotatably attached to side plate 20, and formed unitary with pinion 67 meshing with pinion 62. The end of shaft 66 is flattened at 68 to receive a setting key. A carry-over pinion 69 that is loosely positioned on shaft 61 meshes with gear portion 70 of year wheel 13 and a set of carry-over teeth of a washer 72. This washer is keyed to a sleeve 73 formed integrally with month wheel 12.

The indicating time and meridian wheels placed at the top of the frame 7 are rotatably mounted on shaft 74 supported between the side plates 19 and 20 and are interconnected by the carry-over pinions 75, 76 and 77. The pinions 75 and 76 are loosely positioned on shaft 78 and pinions 77 and 79 are keyed to it.

Figure 13:
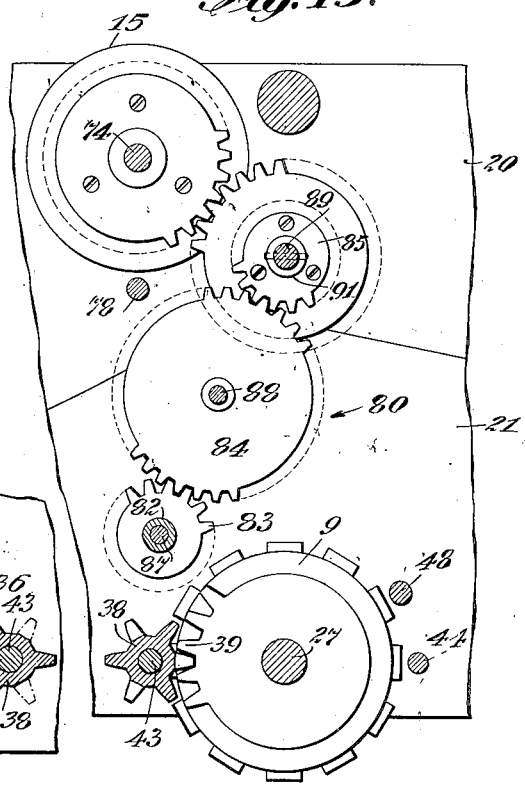
Fig. 13 is a detail sectional view taken along line 13—13 of Fig. 11 and showing the gear train, which interconnects the time printing wheels with the time indicating wheels.

The indicating wheels are interconnected with the printing wheels by a gear train 80 (Figs. 4, 5, 11 and 13). This gear train comprises gear 81 fixed to quill 82, and meshing with gear 33 of wheel 8, and with idler gears 83, 84, 85 and 86. Gear 83 is likewise fixed to quill 82 and so turns in conjunction with 81. The quill 82, gear 84 and gears 85 and 86 are rotatably mounted respectively by shafts 87, 88 and 89, (Fig. 13) carried by side plates 19 and 20. Gears 85 and 86 are clamped together by the screws shown in Fig. 13 and turn, with their supporting quill, on shaft 89, between collars 91 and 92 (Fig. 4).

This arrangement insures that as the type wheels are rotated by their advancing mechanism, (to be described more fully hereinafter), or by the resetting mechanism, the indicating wheels will be carried along in synchronism therewith and so will at all times show what portions of the type wheels are in the printing position. Resetting of the date wheel is accomplished by means of a shaft 93 having fixed to one end thereof a pinion 94 and to the other end thereof a pinion 95. This shaft, which is journaled in side plate 20 and frame member 22, has its end flattened at 96 to receive a setting key. The pinion 94 meshes with a gear 97 fastened to the date wheel 59 by screws 98. This is shown most clearly in Fig. 20.

When the shaft 93 is rotated by the setting key, the wheel 59 is turned through the action of the pinion 94 and gear 97. As the wheel turns, the fingers of the spring washer 58 bend and permit the projections 57 of the flat gear 55 to slip so that the wheel 59 can turn with respect to the carry-over mechanism of meridian wheel 10. The month and year wheel can thus be adjusted without disturbing the reading of the time and meridian wheels.

The date and year indicator

The pinion 95 meshes with a flat gear 98' which constitutes a dial for indicating the date (Figs. 6 and 23). This dial is annular in shape and is rotatably mounted on a hub 99 of a dial 100. This dial, which carries indications of the month, is arranged to turn in conjunction with flat gear 101 which is rotatably mounted on a stub shaft 102 fixed to the side plate 20 and meshed with gear 62. The two dials 98' and 100 so indicate externally the position of the type wheels for printing the date and month. Because of the arrangement of the parts just described, the external indicating dials always turn in step with the type wheels 12 and 13.

The time wheel advancing mechanism

A ratchet wheel 103 is keyed to shaft 87 (Figs. 3 and 11) and upon advancement turns with it the two gears 81 and 83 also keyed to the shaft. In operative relationship with the ratchet wheel is a stepping pawl 104 pivotally carried on the end of a lever arm 105 (Fig. 5). This arm is pivotally supported by a stationary shaft 106 fixed at its ends in the two side plates 20 and 21. The other end of the lever 105 is curved downwardly in the form of a hook 107 so that when the lever 105, carrying the pawl, is in its lower position, it strikes against a tie rod 108 fixedly secured to the frame of the device. This insures that upon forward stepping motion of pawl 104 overthrow will be prevented, the hook striking the tie rod. Extending parallel with the shaft 106 and riveted to the lever 105 and to another bearing member 109 is a cross bar 110.

This bar projects upwardly and serves to support a magnetic armature 111 in proximity to a pair of stepping magnets 112 that are held in fixed position with respect to the arms 3. The armature is attached to the cross bar by screws 344 and is held in spaced relation with respect thereto by spacing washers 114. The magnets 112 are held, at end adjacent the armature, by a non-magnetic angle member 113 which passes in front of the magnets and is attached to the arms 3 at each end by screws. The rear ends of the magnets 112 are joined together by a keeper 116 and are supported from the arms 3 by an angle iron 117 that is fixed to the arms 3 similarly to angle member 113. Electrical energy is conducted to the magnets by connections 118 and 119 leading to binding posts 120 and 121. These binding posts have attached thereto wires 122 leading to a source of energy not shown.

As the magnets are energized by the passage of current therethrough the armature 111 is attracted to the pole faces thereby rotating the lever 105 around shaft 106 and moving the stepping pawl 104 in a left hand direction as shown in Fig. 3 with respect to the ratchet wheel. When the magnets are deenergized, the stepping pawl moves back to its original position under the action of tension spring 123 thereby engaging the ratchet wheel 103 and moving it ahead one step. The pawl is held in engagement with the periphery of the ratchet wheel by a tension spring 124, one end of which is attached to the stepping pawl and the other end of which is fixed to a holding pawl 125 pivotally mounted on the side plate 19. As the ratchet wheel 103 reaches a stationary position after being advanced one step, the stepping pawl 104 is wedged against an abutment lever 126 which is pivotally mounted on the side plate 19 and is engaged at its free end by finger 127.

This finger is also pivotally mounted on the side plate 19 at 128. The end of abutment lever 126 has a shallow notch 129 and a deep notch 130 therein. Normally the end of the finger 127 rests in the shallow notch 129 and is held therein by tension spring 131.

Fixed to the side plate 19 and surrounding the end of shaft 88 is a sleeve 132 which serves as a receptacle for the end of a setting key. This structure is shown most clearly in Fig. 24. A portion of the finger 127 having a bevelled edge, as indicated at 133, projects through a slot in the sleeve 132 towards the center line of shaft 88. When the key is inserted in the receptacle the end of it strikes first on the bevelled edge 133 and moves the finger 127 in a counter-clockwise direction as viewed in Fig. 3, out of engagement with the shallow notch 129 of abutment lever 126. Upon further insertion, the key engages the flattened end 134 of shaft 88 and turns the shaft and gears 81 and 83 carried by it. This movement which causes rotation of the type wheels and indicating wheels at the same time, is permitted by the teeth of the ratchet wheel slipping past the stepping pawl 104 and holding pawl 125. When the abutment lever 126 is in its normal position as shown in Fig. 3, with the finger in the shallow notch 129, the stepping pawl 104 is held in engagement with one of the teeth of the ratchet wheel 103 so that the shaft 87 cannot turn. Thus the type and indicating wheels are prevented from moving past the proper position so that overthrow cannot occur. The spring 123 is fixed to one end to the side plate 19 and at the other end is made fast to a pin 135 secured to the lever 105.

The holding pawl 125 prevents the shaft 87 from turning under the frictional drag of the stepping pawl 104 during movement of that pawl responsive to energization of magnet 112. A spacer 345 of non-magnetic material is attached to the face of the armature to prevent it from sticking to the pole pieces when the current through the mechanism is cut off.

The number unit

A unit 136 is furnished for printing and indicating a number upon each downward movement of the head towards the platen. This unit, which may be caused to print consecutive, duplicate or repeated numbers upon movement of the head, is shown in position in the machine in Figs. 4 and 5 and in detail in Figs. 34 to 44. As shown most particularly in Fig. 37 there is a shaft 138 extending between the two legs of a frame 137 and adapted to turn therein. Rotatably mounted upon this shaft is a unit wheel 139, tens wheel 140, hundredths wheel 141 and thousandths wheel 142. Advancement of the unit wheel is achieved through the agency of a ratchet wheel 143 riveted to a multi-position friction disc 144, the wheel and the disc being rotatably mounted on the hub 145 of unit wheel 139. These two members are held on the hub by a fillet 146 which is made by riveting the end of the hub. A spacer washer 147 is placed between the ratchet wheel and the fillet to prevent rubbing action. A pawl 148 is mounted pivotally on a slide plate 149 which is adapted to reciprocate beside the leg 150 of the U-shaped frame. This plate has a slot 151 through which passes a hollow rivet 152 serving as a guide. This rivet is headed on both sides to prevent the plate from moving away from the leg 150.

The lower end of the plate carries a pin 153 arranged to move in a slot 154 in the leg 150. The plate is also made large enough to extend past the supporting shaft 138 and a slot 155 is furnished to allow longitudinal movement of the plate with respect to said shaft. The pawl 148 which is pressed into engagement with the ratchet wheel by a spring 156 and slides over the teeth of the ratchet upon upward movement of the slide plate and engages the teeth upon downward movement of said plate so as to turn the wheel.

Pin 153 is adapted to be moved up and down upon each printing movement of the head 1 of the machine and in order to permit either consecutive numbers, duplicates or repeats to be made an adjusting mechanism 157 is provided. This arrangement comprises a second ratchet wheel 158 which has two sets of teeth therein as shown in Fig. 41. Alternate teeth 159 are deep and of the same size as those of the ratchet wheel 143, whereas the teeth 160 between the alternate teeth are shallow. This ratchet wheel is rotatably mounted on a shoulder 161 of hollow shaft 162 and the hollow shaft encircles the main shaft 138. The hollow shaft has a portion of reduced diameter which is journaled in an adjusting slide 163 mounted for reciprocating motion with respect to the ratchet wheel 143. The slide has a slot 164 for receiving a pin 165 fixed to the leg 150, and opening 166 for allowing freedom of motion with respect to shaft 138.

Reciprocating movement of the slide is brought about by means of a stub shaft 167 (Fig. 36) freely mounted in the leg 150 and carrying at its inner end a crank disc 168 to which is affixed a crank pin 169. This pin engages a vertical elongated slot 170 in the slide so that when the shaft is turned to different angular positions the slide is moved backward or forward to a new position. The slide is held in position with respect to the shoulder 161 by a collar 171 having a portion of larger diameter adjacent to the slide and at the other end a section of reduced diameter where the collar passes through the leg 150. This collar serves also as a bearing for the shaft 138 and for the slide plate 149. The point of engagement of the collar with the slide plate is made of a diameter larger than that of the small end of the collar but smaller than that of the large end of the collar. The collar is fixed to the leg by being headed over at its small end. Stub shaft 167 has fixed to its outer end a block 172 which has a recess 173 for receiving a spring 174 and a steel ball 175. The spring presses the ball forward into engagement with depression 176, 177 or 178 made in the bottom part of the leg 150, so that the shaft is held in any one of three angular positions. (See Fig. 38.) Two stop pins prevent the block 172 from being rotated too far.

When the block is in the position corresponding to depression 176 the parts occupy the position shown in Fig. 41. The slide is at the extreme left as shown in this figure, and the pawl is held entirely out of engagement with the ratchet wheel 143 so that when the slide plate 149 is moved up and down responsive to movement of the head of the machine, the number wheels 139 to 143 are not turned.

When the block is in the position corresponding to depression 177 the parts are in the position shown in Fig. 40. In this case when the pawl 148 is in engagement with one of the shallow teeth 160 of the ratchet wheel 158 it is held free from the teeth of the main ratchet wheel 143. Upon the next movement of the side plate 149 the pawl engages the deep teeth 159 of wheel 158 and also the teeth of the wheel 143 causing advancement of both of them and consequently the turning of the units number wheel one step for each two reciprocations of the slide plate. When the block occupies the position corresponding to depression 178, the parts are arranged as shown in Fig. 38 and in this state upon each reciprocation of the slide plate the pawl 148 engages the teeth of the main ratchet wheel 143. As the two wheels are in alignment, the pawl, even if in engagement with the shallow teeth 160, will also seize the teeth of the main ratchet wheel. This adjustment assures that for each movement of the head of the machine the unit wheel 139 will be advanced one step.

Referring more particularly to the number wheels and their carry-over mechanism, as shown most clearly in Fig. 37, it will be noted that the driving connection between the friction disc 144 and the unit wheel 139 is brought about by a ball clutch similar to that disclosed in connection with block 172. The unit wheel has a plurality of recesses 179 in it, each of which contains a spring 180 and a steel ball 181.

The spring presses the ball into one of a series of depressions 182 in the friction disc 144. There are ten of these depressions and they are arranged so that even if the number wheel is turned angularly with respect to the friction disc and ratchet wheel 143 it will always assume a position such that the teeth on the ratchet wheel and the numbers on the unit wheel will be in alignment. The tens, hundreds and thousandths wheels are likewise furnished with ball clutches and friction plates similar to that already described. There is a slight difference though as in the present case the friction disc, which on the tens wheels is indicated by reference numeral 183, has on its periphery gear teeth for forming part of the carry-over mechanism. Each of the friction discs is mounted on a hub forming part of the number wheel and is prevented from endwise motion with respect thereto by a fillet made by heading over the end of the hub. A spacer washer similar to 147 is also furnished to insure free rotation of the friction disc with respect to the hub and still prevent displacement thereof. The left hand side, as viewed in Fig. 37, of each of the number wheels 139, 140 and 141 is furnished with a pair of carry-over teeth and these are arranged to cooperate with a carry-over pinion such as 184. There are three of these pinions and they are mounted for free rotation on a stationary shaft 185 fixed to the legs of the frame 137. The carry-over pinions are kept from longitudinal displacement by a forked member 186 which is fixed to the top of the frame member. The teeth of this forked member are positioned between the different carry-over pinions (Figs. 36 and 37).

After the unit wheel 139 has been turned through ten different steps, the carry-over pinion 184 is operated to advance the tens wheel 140 in the usual manner. The other number wheels operate in a similar fashion. The wheels under discussion serve both as type wheels and indicator wheels and so carry two sets of numbers, one set raised for printing and the other set depressed for indicating. This is shown in Fig. 36 wherein the type numbers are indicated by 187 and the indicator numbers by 188. The two series of numbers are displaced with respect to one another so that when a certain number is being printed, the same number is being shown through a sight opening in the housing of the head.

For insuring that the ratchet wheel 143 will turn independently of ratchet wheel 158, a spacer member 200 is placed between them. This is connected to a pin 201 fixed to the leg 150. This pin also carries a pawl 202 that engages with the main ratchet wheel 143 and prevents reverse motion thereof. The slide 163 has another holding pawl 203 pivotally mounted on it and the function of which is to prevent reverse movement of ratchet wheel 158. Springs 204 and 205 are used for holding the pawls 202 and 203 respectively, in position.

The number wheel resetting mechanism

For resetting the counting device, each wheel is provided with a spring pressed plunger 189 which is made to slide in a recess in the wheel. The spring and plunger are held in operating position by a screw such as 190 (Fig. 43).

The unit number wheel has two plungers, as shown in Fig. 42, whereas the other wheels have but one. This is so that all of the wheels can be set to zero or so that the counter can be set to any desired number by turning the unit wheel only. The plungers 189 furnished for each of the number wheels are arranged at a certain angle as shown in Figs. 42 and 43 and are adapted to engage with a correspondingly arranged groove 191 in the shaft. There is also a groove 194, arranged similarly to 191, in the shaft which registers with the plungers 192 and 189 of the unit wheel and is adapted to engage the plunger 189 thereof upon the resetting portion. The shaft has also two grooves 193 and 194 which are arranged oppositely and displaced relative to one another lengthwise of the shaft. Groove 194 normally aligns with the plungers in the unit wheel but when the setting shaft is pushed in to the position shown dotted in Fig. 37 only groove 193 registers with said plungers. The extra plunger 192 of the unit wheel is arranged at a different angle and is adapted to cooperate with the oppositely arranged groove 193, as shown in Fig. 37. This arrangement insures that when the shaft is rotated in a clockwise direction as viewed from the right hand side of Fig. 37, all of the plungers 189 will snap into their respective grooves so as to key the number wheels to the shaft. On the other hand if the shaft is rotated counterclockwise, all of the plungers 189 will be forced out of the grooves. When the shaft is in the position assumed, the full line positions shown in Figs. 36 and 37, all of the number wheels are subject to the same treatment but when the shaft is displaced axially to the dotted position shown in Fig. 37, the unit number wheel, through the agency of the oppositely displaced plunger 192 and through cooperating groove 193, can be turned in counterclockwise direction.

When the shaft is in the full line position of Fig. 37 and is rotated clockwise, first one number wheel then another will be picked up, depending upon their relative angular positions, and at the time when a full turn has been made on the shaft, all of the plungers 189 will have dropped in the cooperating grooves and brought all of the number wheels into alignment, for example, the zero position. On the other hand when the shaft is in the dotted position and it is rotated in a counterclockwise direction, only the unit wheel will be turned so that it may be set individually.

The end of the shaft is turned down at 195 to receive a setting key or knob 196. A pin 197 passes through the shaft and registers with a notch cut out of the end of the key. The key is made hollow as shown at 198 and has an internal shoulder against which a holding screw 199 may bear. This screw is threaded into the end of the shaft.

The entire unit 136 is of the proper width to go between the ends of side plates 19 and 20. Attached to the ends of these side plates are a pair of cast guides 206 and 207 each of which is channeled as shown at 208 (Figs. 4 and 5) to receive the legs of the U-shaped unit 136. These guides are cut away as shown at 209 to permit the cams 210 to turn (Figs. 3 and 36). There is one cam at each side of the frame 137 and these are keyed to an adjusting shaft 211 which is journaled in the two legs of the U-shaped frame. Each cam has a gradual rise 212 and three flat faces 213, 214, 215 at different radial distances from the center of the shaft and a leaf spring 216 is fixed to the top of the frame member as best shown in Figs. 36 and 38.

This spring extends out past the legs of the frame and engages with the top surfaces of the guides 206 and 207. Thus, when the shaft 211 is turned carrying with it the two cams 210 the frame 137 will be raised or lowered with respect to the guide members against the resistance of spring 216. Because of the plurality of flat faces on the cam at different radial distances from the center of the shaft carrying them, the frame 137 may be held in a plurality of different vertical positions with respect to the guides. The key 217 is secured to the end of shaft 211 for turning it. This construction enables the consecutive counting unit to be removed from the machine quickly and easily merely by taking out the shaft 211 and sliding the unit vertically out of the guides 206 and 207. Repairs may easily be effected in this manner. A flat spring 350 fastened to side plate 20, Fig. 6, serves to hold the setting shaft 138 in the full line position shown in Fig. 37.

Number wheel advancing mechanism

For operating the slide plate 149 and causing the pawl 148 to engage the ratchet wheel 143, a lever 218 (Fig. 3) is pivotally mounted at 219 on the side plate 19. This lever has its end bifurcated to engage the pin 153 and carries at its other end a pivot pin 220 which is in turn engaged by the forked end of a lever 221 pivotally mounted on the side plate 19 at 222. The other end of lever 221 has attached to it a roller 223 which strikes upon an anvil 224 joined to lever 225.

This latter lever is pivoted to an angle plate 226 supported by the bed plate 227 of the base of the machine. The free end of the lever 225 is resiliently held against motion in a counterclockwise direction, as viewed in Fig. 3, by a spring 228 which is fastened to the angle plate. When the head is in normal position the spring 228 draws the lever 225 into engagement with a stop 229. When the head is moved downwardly to cause printing action to take place the roller 223 strikes on anvil 224 (Fig. 3) and rocks the lever 221 in a counterclockwise direction from its normal position. This causes the lever 218 to be turned in a clockwise direction thereby lifting pin 153 and with it the side plate 149. The parts are shown in the operated position in Fig. 3. The movement of the levers to this position is resisted by a tension spring 230 interconnecting lever 221 with arm 3. When the head is returned to its normal position the spring just mentioned draws the levers 218 and 221 back to its initial position thereby moving the slide plate 129 downwardly. The pawl 148 which is carried by the side plate and is in engagement with ratchet wheel 143 advances the wheel one step whereby a number is run in on the unit wheel 139 of the counter. The resilience introduced into the number wheel advancing system by lever 225 and spring 228 insures that whatever the vertical position of unit 136, a proper stroke will be given the pawl 148 without injury to the operating parts.

Ribbon advancing mechanism

An inking ribbon 231, carried by spools 232 and 233, passes around the face of both the number wheels and time wheels as indicated most clearly in Fig. 5. The spool 232 is rotatably supported by the end of the guides 206 and 207 and the spool 233 is carried by the side plates 19 and 20. This structure is shown most clearly in Fig. 3 wherein it will be noted that the end of each of the guide plates 106 and 107 is provided with a vertically disposed notch 234 for receiving the end of a small shaft 235 passing through the spool. This shaft is held up in the notch just mentioned by finger 236 pressed into position by a spring 237. The spool 233 at the other end of the ribbon has also a shaft 238 which is slipped into a notch 239 in the side plates 19 and 20 and held in position by fingers 240 resiliently pressed by springs 241. Spools 232 and 233 have attached to them respectively ratchet wheels 242 and 243 (Fig. 9). For engaging with these ratchet wheels, pawls 244 and 245 are furnished. The former is carried by a lever 246 which is slotted intermediate its ends, at 247, and rockably mounted on a pin 248 fixed to the side plate 20. The pawl is held in active position by a spring 249. The other end of the lever is pivotally connected at 250 to a lever 251 which carries the other pawl. This other pawl, 245, is pivoted to the lever 251 at 252 and is held in working position by a spring 253. The last mentioned lever is slidably mounted in a clip 254 also fixed to the side plate 20 and has its free end forked at 255 to receive a pin 256 of lever 257.

This lever is pivotally mounted on a screw 258 attached to arm 3 and is spaced from the arm by a sleeve 351. A coil spring 259 serves to urge the lever 257 in a clockwise direction as viewed in Figs. 6 and 9. Too great a movement in this direction is prevented by a stop pin 260 fixed to the arm 3. The end of this lever adjacent to fork 255 carries a roller 261 which is adapted to strike on a vertical post 262, secured to the bed plate 227, when the head is in its printing position.

It will be seen that the arrangement of the parts described is such that when the head is moved downwardly to make an impression on a sheet of paper the roller 261 will strike the post 262 and rock the lever 251 in a clockwise direction, as viewed in Fig. 9, thereby tilting the lever 246 in a counterclockwise direction. Both of these levers are mounted for endwise movement and their position is controlled by a mechanism including a drag link 263 pivoted to lever 251 at 264 and having at its end an aperture for receiving crank pin 265 secured to bell crank 266. This bell crank, which is pivotally mounted on side plate 20 at 267, has a pin 268 at its free end and this pin is interconnected by a spring 269 with the end of an arm 270 pinned to a rock shaft 271. The rock shaft also has a feeler finger 272 keyed to it, which is adapted to engage the ribbon on the spool. A spring 273 coiled around the rock shaft urges the finger against the roll of ribbon.

The arrangement of the bell crank arm and the passing center spring 269 is such that when the arm is rocked upwardly sufficiently, by the accumulation on the spool of a predetermined amount of ribbon, the spring moves past the pivot center 267 of the bell crank thereby quickly rotating the bell crank clockwise, as viewed in Fig. 9, and pushing the drag link 263, which carries with it both of the levers 251 and 246, to the right. This movement takes the pawl 245 out of engagement with the ratchet wheel 243 and moves the pawl 244 into cooperating relationship with the ratchet wheel 242.

To insure that half-way movement of the levers will not take place, a locking dog 274 is placed in cooperating relationship with a pair of notches 275 and 276 in the link 263. There is a projection 277 on the side of the locking dog and this is adapted to engage with a cam 278 fixed to the rock shaft. The cam is hollowed out at the end so that in two extreme positions of the rock shaft, the cam engages the projection 277 and lifts the locking dog free from the notches of the link, but when the rock shaft is in an intermediate position permits the dog to engage one of the notches just mentioned.

The angular position of the cam on the shaft just mentioned, is such that it will lift the dog free only after an amount of ribbon in excess of that predetermined as necessary to cause the spring 269 to pass by the center, has been wound on the spool 233. In action, a predetermined amount of ribbon winds up on the spool 233 thereby turning the rock shaft 271 far enough to tension the spring 269 and to make it pass by center 267, then at a short interval thereafter, upon further movement of the rock shaft, the cam 278 lifts the locking dog free from the notch of link 263 with which it is engaged, and permits the lever 246 quickly to move endwise under the pull of spring 269 and shift the feeding direction of the ribbon. The ribbon then feeds in the opposite direction until the finger 272 again moves back far enough to carry spring 269 past the center and to move the cam 278 to unlocking position, whereupon the entire mechanism is reset to the original position.

The printing head and operating mechanism therefor

The head 1 may be moved up and down by hand or it may be worked automatically by the insertion of a sheet of paper between the head and the platen. For achieving this latter action, we have provided a solenoid 279 (Fig. 3) mounted inside of the base of the machine. A plunger of magnetic material 280 is arranged for axial movement inside of said solenoid and is connected by means of a drag link 281 to a crank arm 282 mounted on shaft 4. A bell crank 283 is also mounted on the shaft and has a widened end 284 which is connected to the arm 282 by a screw 285 and to the arm 3 by a thumb screw 286. The lower end of the bell crank is connected by a pair of pull rods 287 with a counter balance spring 288 hooked to a screw eye 289 in the base of the machine. The tension in the spring 288 is sufficient to hold the head in the normal raised position shown in Fig. 1, so when the solenoid is energized by the passage of the current through it the head is pulled down into engagement with the platen 290, against the pull of the spring just mentioned. Interconnected in the circuit of the solenoid is a control switch 291 (Figs. 3, 7 and 27 to 33). This switch is adapted to be operated by a curved lever 292 pivoted to the base of the machine at 293 and extending upwardly into the path of travel of the sheet of paper upon which an impression is to be made. The lower end of the lever is curved to come into engagement with the trigger of insulating material 294 of the switch (Figs. 28 to 33) which will be described in detail hereinafter.

The switch, condenser, and other working parts in the base of the machine are protected by a cover plate 346 which entirely closes the base of the machine and serves as a support therefor. A shelf 329 (Figs. 1 and 25) is fixed to the bed plate 227 and extends outwardly from the machine to support a sheet of paper which might be wider than the platen. This shelf has a turned lip 330 at the rear end to prevent the paper from being pushed in too far. A curved guide 331 is attached to anvil 224 to keep the paper from passing over the top of the anvil during its insertion. The platen 290 may be of rubber composition or other suitable material.

The platen is shown in plan view in Fig. 25 and it will be noted that it is cut away at a pair of spaced points 332. These points are on each side of the spot 333 where the large date wheel 59 strikes the platen. The function of these two depressions is to prevent smudging of the paper, or a partial impression thereon, at both sides of the number to be printed. The number wheel is relatively large and so its arc of contact on the platen is greater than necessary to produce an impression of a single set of type numbers, especially where these numbers are relatively close together around the rim of the wheel. By provision of the depression shown, it is insured that no undesired impression will be made because there is nothing underneath the paper and ribbon at those points to receive the pressure of the type wheel.

The entire head is enclosed and protected by a housing 334 fastened on each side to the end of shaft 4, by means of acorn nuts 335, and held in proper spaced relationship by washers 336. A transparent window 337 is made in the housing through which the position of the date and month wheels may be seen. There are also transparent windows 339 and 349 through which the time and number indicating wheels respectively may be viewed. One side of the end of the housing has a plate 340 affixed thereto through which the keys of setting shafts 167 and 138 and of the adjusting shaft 221, project. The openings for these keys are made elliptical so that the number unit 136 may be raised or lowered slightly by means of shaft 211 in the manner already described. Legends are stamped adjacent the key of this shaft indicating in which positions of it the time, number, or time and number, are printed by the machine. The plate also bears indicia showing the positions of the stub shaft 167 and crank disk 168, at which the number unit prints consecutive numbers, duplicates or repeats the same number continuously. The adjusting keys carry pointers 341 for showing the angular position of the shafts to which they are attached (Fig. 34). 338 and 348 are legend plates indicating the time and number sight openings.

The end 342 of the housing 334 adjacent the ribbon spool is made to fit as closely as possible to the top of the spool and so to form a key or push plate whereby the head of the machine may be brought manually into contact with the platen to cause an impression to be made. When used in this manner the solenoid 279 may be disconnected. The operator may hold a sheet of paper between the thumb and first finger, put it between the head and platen and move the head to produce an impression by placing the other fingers of the hand on the key portion of the housing.

*The control switch*

The switch 291 comprises a trigger 294 rockably mounted on a center 300 fixed to two insulating side plates 296 and 297 which form, in connection with the metallic frame or sleeve 298, the casing of the switch. The side plates are held stationary with respect to the frame by screws such as 299. The center or pivot of the trigger consists of a shaft 300 to which the trigger is fixed and which projects into bearing sleeves 301 and 302 embedded into the side plates. Spacing washers 303 are placed between the trigger and the side plates to keep the parts in alignment. A metal anvil 304 is fixed to the end of the trigger which projects through an aperture in the casing so that it may be engaged by the lever 292. A stationary contact shaft 305 is held by the two side plates. This shaft has formed integrally therewith a pair of collars 306 which serve to space the two side plates, and is threaded at one end to receive nuts 307 which hold the shaft in position with respect to the side plate 295 and also clamp the connecting wire 308 in position. Another shaft 309, similar to 305, is provided and this has nuts at the end for holding the wire 310. Hooked around this shaft is a U-shaped contact finger 311 having a loop 312 at the end in engagement with the shaft 309. A tongue 313 is struck out of the contact finger and is curved slightly, as best shown in Fig. 30, to engage with the shaft hard enough to give an appreciable amount of friction to the connection. The friction and sliding contact of the tongue 313 on the shaft 309 insures a clean efficient electrical connection at all times and obviates the necessity of a connecting wire.

A yoke 314 is riveted to the bottom side of the finger and the legs of the yoke are furnished with elliptical apertures 315. The end of trigger 294 has a pin 316 pressed therein and the ends of this pin are positioned in the elliptical openings just mentioned. For holding the trigger in a fixed normal position, a leaf spring 317 is connected to a turned-in end 318 of side plate 297. This spring engages with a projection 319 of the trigger.

The distance between the shaft 305 and 309 is such that the end of finger 311 just touches the shaft 305 when the anvil 304 of the trigger is pushed in towards the case a slight amount, and the end of the finger is curved slightly at 320 to form a cam, the effect of which is to slide the finger 311 left-handedly, as viewed in Figs. 28 to 33, upon the continuation of travel of the anvil 304. A force is likewise exerted on the finger by rotation of the trigger, as the center of rotation of the trigger is spaced from that of the finger and so located as to exert a thrust on the finger in the direction of its pivot point. This endwise movement of the finger is opposed by the friction between tongue 313 and shaft 309 so that a wiping contact of relatively great pressure is made between the curved end of the finger and the shaft 305. A guide 321 is provided for holding the edge of the sheet of paper 322 when it is inserted in the machine. This guide consists of an inclined shoe 323 and a pair of slightly curved retainers 324 placed at the sides of the shoe.

As the paper is inserted it slides up the shoe 323 and strikes against the lever 292, rotating that lever counterclockwise, as viewed in Figs. 28 to 33, and pushing the anvil 304 into the casing of the switch to close the contacts thereof. The open position of the switch is shown in Fig. 28. Fig. 31 shows the switch just after the paper has caused the finger 311 to be moved into engagement with the contact shaft 305. In this position the circuit is closed through the switch and energy is supplied through the solenoid winding, the head of the machine being pulled down into engagement with the platen. As the head comes down, the push rod 325 attached to one of the arms 3 strikes on an ear 326 of the lever 292 and forces the lever in a counterclockwise direction, which results in the anvil 304 being driven smartly into the casing. This motion in conjunction with the cam action of the curved end of the finger causes the finger to be displaced axially and so to slip past the contact shaft 305 to the position shown in Fig. 32. The circuit through the switch is now broken and, as the solenoid is no longer energized, the head returns to its normal position under the pull of the counterbalance spring 288. Upon return motion of the head the spring 317 rocks the trigger 294 back to its initial position and the finger 311 is likewise returned to normal. The finger passes through the successive dotted positions shown in Fig. 33 and so is prevented from touching the contact shaft 305 at all. This insures that the solenoid 239 is not again energized until another sheet of paper is inserted.

During the return movement the pin 316 in the end of the trigger occupies the extreme right hand end of the elliptical opening 315 in the yoke 314 and exerts a drag tending to move the finger endwise as well as to rotate it toward its original position. Endwise movement is resisted by the friction of tongue 313 on the shaft 309 until the finger is entirely free of the contact bar 305 and nearly back to its initial position. This will be obvious from a consideration of Figs. 33 and 28. During the closing movement of the switch the pin occupied the left hand end of the elliptical aperture as shown in Fig. 31, and so aided the cam effect of curved end 320 in moving the finger 311 endwise out of engagement with shaft 305. As will be evident from the drawings this action results from the fact that the centers of rotation of the trigger and the contact fingers are spaced from one another.

The wiring diagram of the electrical parts of the machine are illustrated in Fig. 27. As shown in this diagram, an electrical condenser 327 is connected across the terminals of the control switch 291 to prevent excessive sparking at the contacts thereof. The stepping magnet 112 for the time wheels may be operated by any master time clock or synchronous electric clock arrangement which is indicated in Fig. 27 by 328. This device should send out periodical impulses to the stepping magnet so as to advance the time wheels.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a printing mechanism having a platen and a plurality of unitary structures comprising printing elements movable relative to each other and to the platen in which one unitary structure comprises printing elements for printing numerals and another unitary structure comprises printing elements for the time and date, the combination of a frame for supporting the time and date printing elements, a second frame supported by said first named frame and movable relative thereto for supporting the numeral printing elements, means for moving said platen relative to said time and numeral printing elements to effect a printing operation by said printing elements, and means for moving said second frame relative to said first frame to render the printing operation of said numeral printing element ineffective upon the relative movement of said platen and printing elements whereby printing is effected only by the time and date printing elements.

2. In a printing mechanism having a platen and a plurality of unitary structures comprising printing elements movable relative to each other and to the platen in which one unitary structure comprises printing elements for printing numerals and another unitary structure comprises printing elements for the time and date, the combination of a frame for supporting the time and date printing elements, a second frame supported by said first named frame and movable relative thereto for supporting the numeral printing elements, means for moving said platen relative to said time and numeral printing elements to effect a printing operation by said printing elements, and means for moving said second frame relative to said first frame to render the printing operation of said time and date printing elements ineffective upon the relative movement of said platen and printing elements whereby printing is effected only by the numeral printing element.

3. In a printing mechanism in which a platen and printing elements are movable relative to each other by an electro-magnetic device connected by a circuit to a source of current supply upon the insertion of an article to be printed upon into printing position whereby a printing operation is effected, the combination of a switch for controlling the circuit of said electromagnetic device comprising a fixed bearing, a stationary contact, a contact arm supported by said bearing and rotatable into engagement with said stationary contact by the insertion of the article to be printed upon into printing position, said arm having a slidable connection with said bearing such that the arm can be moved longitudinally of itself and radially of said shaft into and out of engagement with said contact.

4. In a printing mechanism in which a platen and printing elements are movable relative to each other by an electro-magnetic device connected by a circuit to a source of current supply upon the insertion of an article to be printed upon into printing position whereby a printing operation is effected, the combination of a switch for controlling the circuit of said electromagnetic device comprising a fixed and a movable contact, a member movable by said article to be printed upon when inserted into printing position for engaging said movable contact to move it against said fixed contact to close the circuit to said electromagnetic device whereby relative motion of the platen and printing elements is effected, a second member movable by said relative movement into engagement with said first named member to continue the motion of said first named member in the same direction whereby the movable contact is moved beyond the fixed contact to open the circuit of said electromagnetic device, and means for restoring said movable contact back to normal position past and apart from said fixed contact upon withdrawal of the article to be printed upon from printing position.

5. In a printing mechanism in which a platen and printing elements are movable relative to each other by an electro-magnetic device connected by a circuit to a source of current supply upon the insertion of an article to be printed upon into printing position whereby a printing operation is effected, the combination of a switch for controlling the circuit of said electromagnetic device comprising a fixed bearing, a stationary contact, a contact arm supported by said bearing and rotatable into engagement with said stationary contact by the insertion of the article to be printed upon into printing position, said arm having a slidable connection with said bearing such that the arm can be moved longitudinally of itself and radially of said shaft into and out of engagement with said contact, means operable by the insertion of an article to be printed upon into printing position for rotating said arm about said shaft into engagement with said stationary contact whereby relative movement of said platen and printing elements is effected, means operable by said relative movement to continue the rotation of said arm, and means effective upon said continued rotation for moving said arm radially of said shaft and away from said stationary contact.

6. In a printing mechanism in which a platen and printing elements are movable relative to each other by an electro-magnetic device connected by a circuit to a source of current supply upon the insertion of an article to be printed upon into printing position whereby a printing operation is effected, the combination of a switch for controlling the circuit of said electro-magnetic device comprising a fixed contact and a contact arm supported by a fixed bearing and movable angularly and radially about said bearing, means operated by the insertion of the article to be printed upon into printing position to move said arm angularly about its support into engagement with said fixed contact to effect relative movement of said platen and printing elements whereby a printing operation is effected, means for restraining radial movement of said contact arm, and means effective upon said relative movement of the platen and printing elements for rendering said restraining means ineffective whereby said contact arm is moved radially of its support and from the fixed contact to terminate the printing operation.

7. In a printing mechanism in which a platen and printing elements are movable relative to each other by an electro-magnetic device connected by a circuit to a source of current supply upon the insertion of an article to be printed upon into printing position whereby a printing operation is effected, the combination of a switch for controlling the circuit of said electro-magnet comprising a fixed and movable contact, means operated by the insertion of an article to be printed upon into printing position for moving said movable contact along a certain path to engage said fixed contact whereby relative movement of said platen and printing elements is initiated to effect a printing operation, means operated by said relative movement to continue the movement of said movable contact beyond said fixed contact to terminate the printing operation, and means effective upon the termination of said printing operation and upon the removal of the article to be printed for moving said movable contact back to normal position along a path different from said certain path whereby engagement of said contact with the fixed contact is avoided.

VERNON M. BUGG.
JOHN F. MILLIGAN.